Feb. 22, 1944. W. G. REYNOLDS 2,342,222
METHOD AND MEANS FOR REGULATING THE FORMATION OF LAP ROLLS
Filed July 9, 1937 9 Sheets-Sheet 8

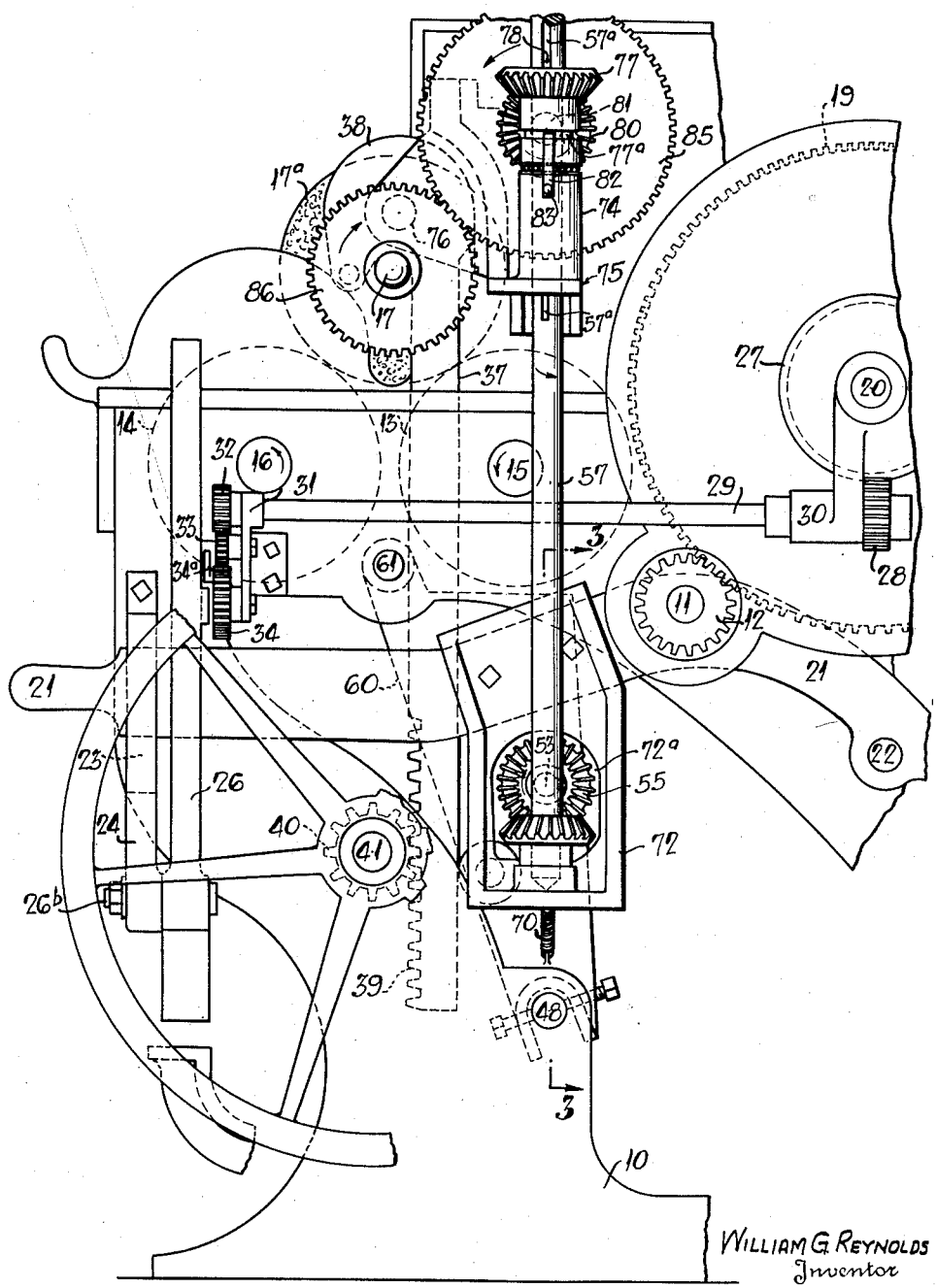

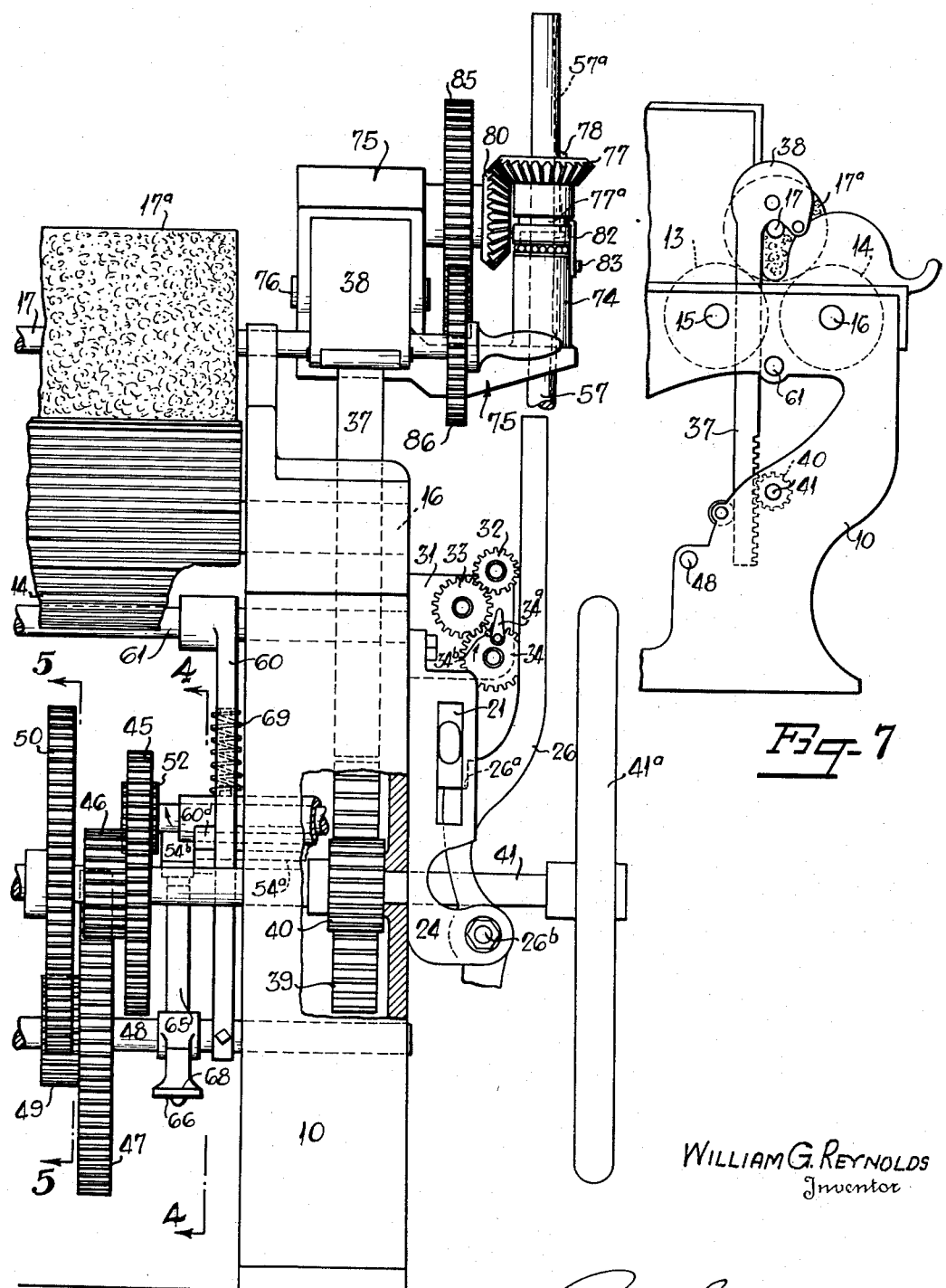

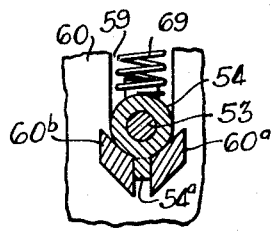
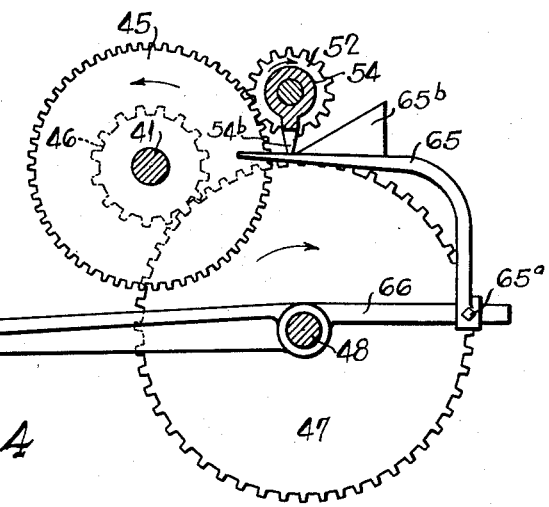
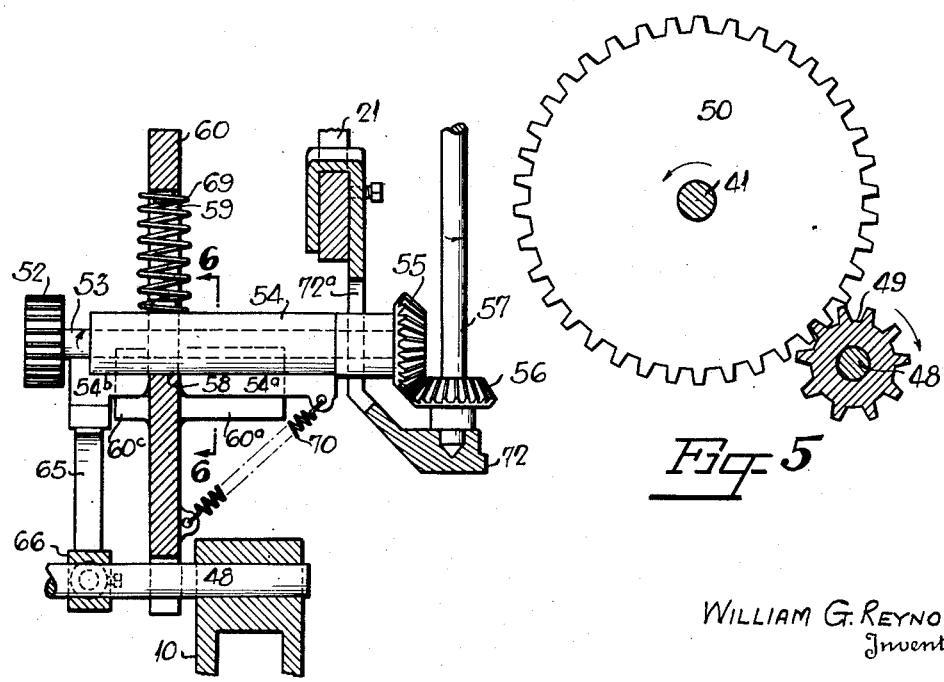

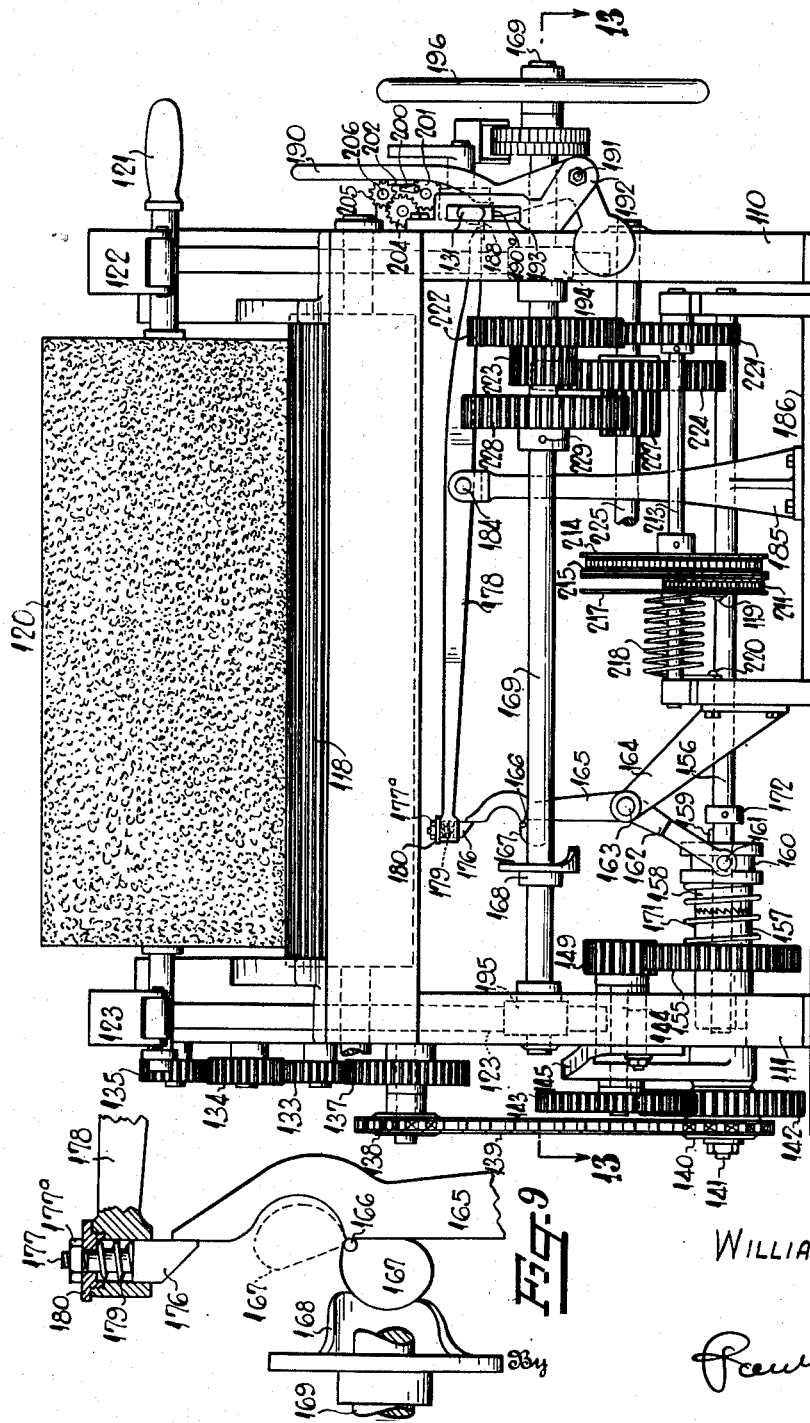

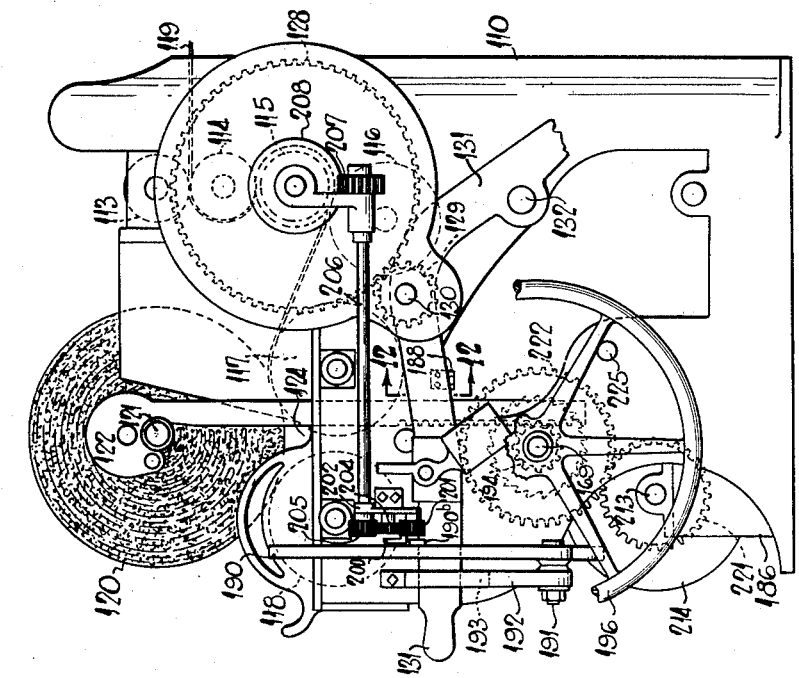
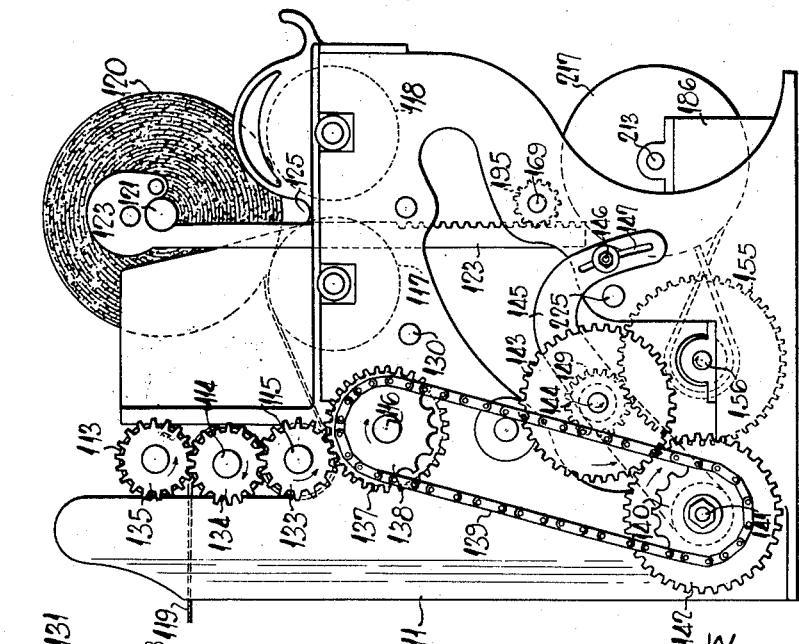

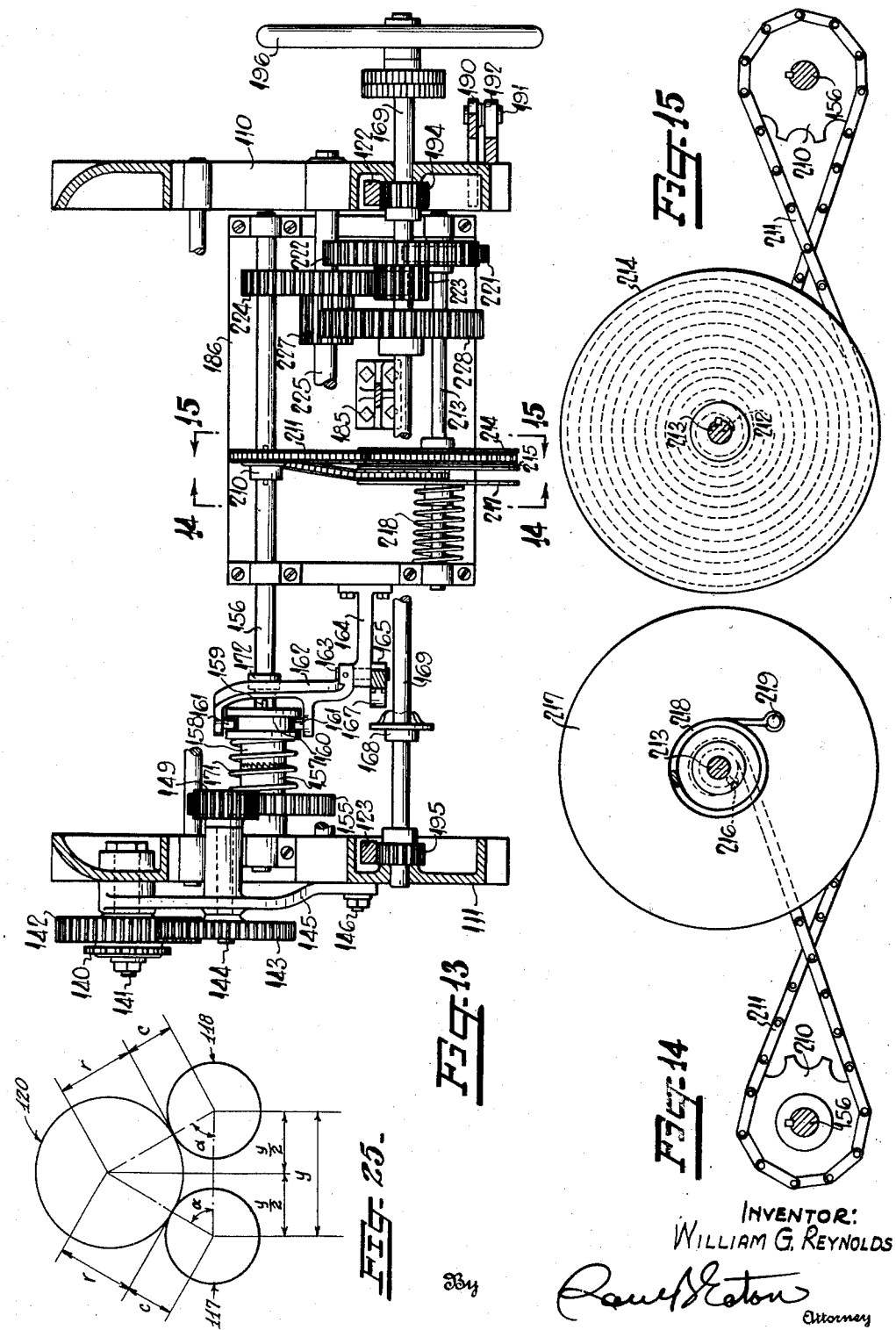

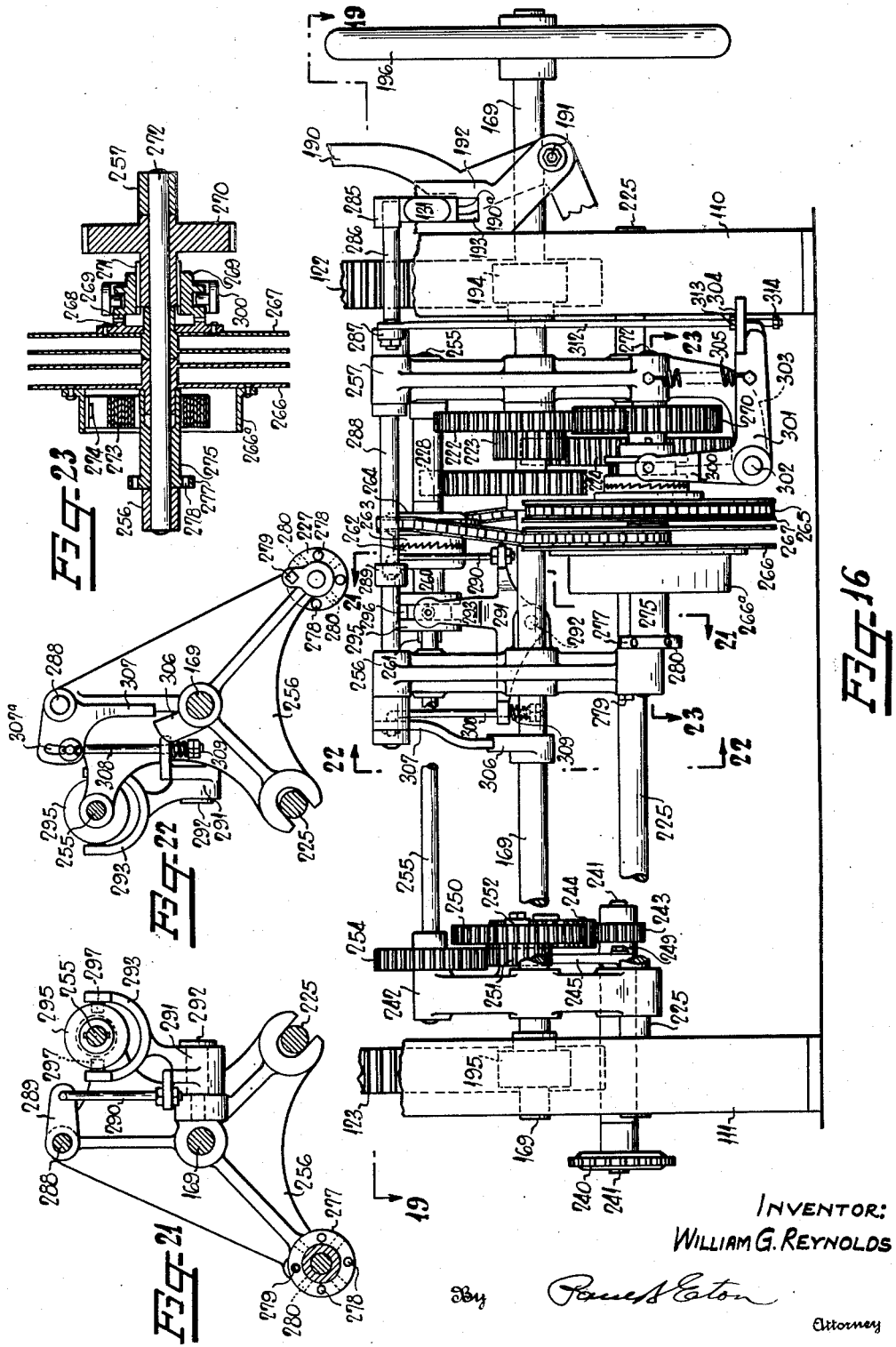

INVENTOR:
WILLIAM G. REYNOLDS
By
Attorney

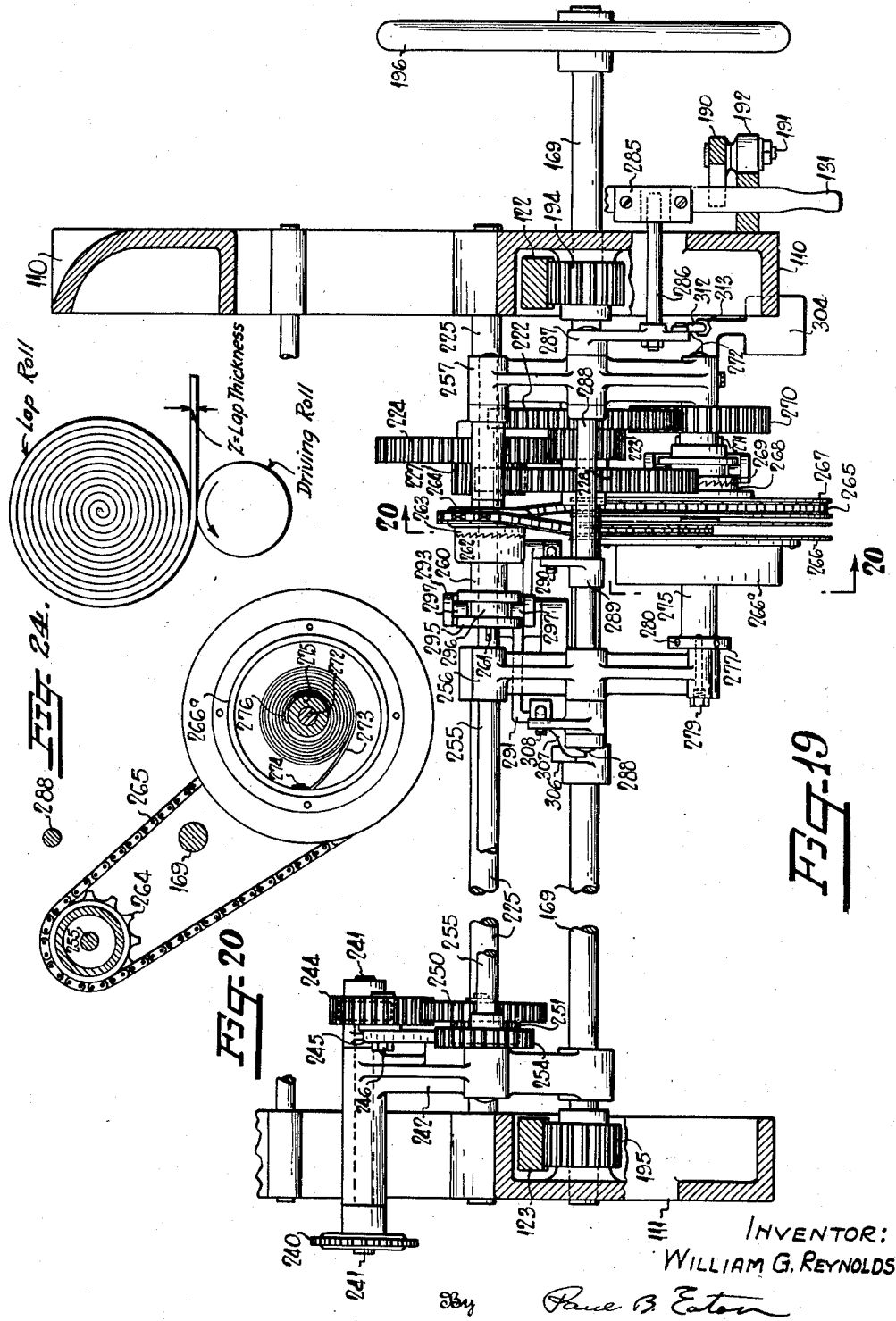

Patented Feb. 22, 1944

2,342,222

UNITED STATES PATENT OFFICE 2,342,222

METHOD AND MEANS FOR REGULATING THE FORMATION OF LAP ROLLS

William G. Reynolds, Monroe, N. C.

Application July 9, 1937, Serial No. 152,805

34 Claims. (Cl. 19—162)

This invention relates to an improvement in let-off means for cotton pickers and other machines which wind a continuous supply of material into laps or rolls.

In the winding of cotton laps, for example, it has been customary to resort to uncertain frictional means for maintaining a relatively uniform pressure between the pin upon which the lap is wound and the frictional driving rolls which transmit the winding motion to the lap. Each end of the lap pin is held against vertical movement, as more material is being wound upon it, by means of a head block formed on the upper end of a calender rack. These racks mesh with pinions mounted on a horizontal shaft located below the lap driving rolls and, through a system of gearing well known in the art, drive a brake drum at several times the speed at which the pinions are turned as the racks are raised by the increasing diameter of the lap when more and more material is wound upon it.

A friction belt or brake, usually weight-regulated, applies friction to the brake drum, and, through the gearing already mentioned, transmits through the pinions a resistance to the upward travel of the calender racks. This resistance is, in turn, transmitted downwardly upon the lap pin by the head blocks and thus creates pressure on the material being wound about the lap pin between its surface and the driving rolls on which the lap rests.

This pressure tends to lift the lap pin and, through the head blocks, the racks, pinions, and other gearing, causes the brake drum to slip and turn despite the resistance applied by the brake. Thus, the head blocks are, in theory, forced upward gradually by the lap pin in proportion to the increase in diameter of the lap as more and more material is wound onto it.

There are several defects in this method. First, the amount of friction varies with changes in humidity, or temperature, or the cleanliness of the surfaces of the brake pulley and brake. This causes variable pressure on the lap, so that some laps are tight and some loose and fluffy. A tight lap tends to expand unduly when the pressure is removed and thus stretches the outer layers, often unevenly due to less perfect cohesion of the fibers in certain parts of the material. These loose, fluffy laps tend to fall apart or tear when handled.

Second, the movement between brake pulley and brake is often a series of quick jerks instead of a smooth, continuous slip. These jerks are transmitted to the lap and produce thick and thin places in the sheets of fiber being wound upon it. One of these thick or thin places will produce several yards of yarn, so that the effect of these thick and thin places is to make more difficult and costly the production of even, uniform yarn because more doublings must be made to minimize the variations which have originated in the lap.

Third, it is extremely difficult to adjust and maintain exactly equal friction on two or more brakes as will be obvious by considering the difficulty of keeping automobile brakes in proper adjustment and the complicated mechanisms which have been developed to overcome this trouble. Thus, two pickers, running side by side, will produce laps different in diameter and density and it is more difficult to keep even, two machines running alike. In large picker rooms, even under the best of care and conditions, the laps vary considerably and these variations are transmitted to the yarn in subsequent operations.

My invention provides a positive mechanical let-off which prevents all of the difficulties enumerated and, in addition, it contains new and useful means for winding materials under uniform pressure onto take-up rolls driven by frictional contact with the material being wound thereon. It is adjustable both as to the length and the thickness of the material to be wound onto the roll. When once adjusted to meet a given set of conditions it needs no further attention until either length or thickness of the material is changed. It can be applied to old machines or to new machines.

My invention overcomes the necessity for shear pins and other safety devices in the head blocks which are provided for safety against excess pressure created by the inertia of starting the brake drum which theoretically should not stop during the winding of a lap roll but which in practice often stops.

It is therefore, an object of this invention to provide for letting off the pressure on the wound package as it is being formed, governing the rate and ratio of the let-off mechanism according to the increasing size of the package being wound; that is, by the length of the material which is fed to the roll being wound. In this manner it is evident that a package of the desired size and compactness can be formed regardless of the temperature and the humidity in the mill in which the machine is located.

It is another object of this invention to provide in a machine for forming wound rolls, positive non-yielding pressure applying means for the winding rolls during their formation which will apply pressure to a package during its formation which is uniform throughout and which is positively driven by the winding roll as it is formed, thus moving the pressure applying means gradually as the winding roll revolves and thus eliminating the unknown and uneven factor of the friction let-off for the pressure applying means for the winding rolls.

It is a further object of this invention to provide a machine for forming web rolls on arbors with pressure applying means driven by the rotation of the arbor and moved in timed relation to the rotation of the roll during its formation, and also having means for disconnecting the pressure applying means from the means driven by the arbor while a finished package is removed and a new package started on a new arbor and the pressure applying means moved to adjusted position, at which time the arbor of the winding roll may be connected to the means driven thereby, for moving the pressure applying means upwardly as the roll is formed, thus preserving an even pressure at all times on the winding roll.

It is still a further object of the invention to provide a non-yielding let-off means for positively applying pressure on web rolls, warp rolls, and the like, or in fact any take-up roll which is driven by frictional contact with the material being wound, and is for the purpose of evenly winding and applying even pressure to the material being wound onto the winding roll by the revolutions of the winding roll, and to the automatic mechanism driven by the winding roll. Also, a further purpose is to deliver a finished wound package of a specified number of windings or revolutions in a finished or wound package without resorting to the necessity of frictional devices, or varied by temperature, atmospheric or other conditions.

It is yet another object of the invention to provide apparatus which is positively driven by a constantly driven shaft which moves in timed relation to the other portions of the machine, said apparatus comprising a spool disposed in a geared connection between the let-off means of a picker and the constantly driven shaft for releasing the let-off means at such a rate as to cause the pressure applied to the lap roll during its formation to be uniform, with a chain wound on the spool in spiral form and the roll of chain being at all times directly proportional to a cross-section of the lap roll.

This application is a continuation in part of my copending patent application, Serial Number 24,076, filed May 29, 1935.

Some of the objects of the invention having been stated, other objects will appear as the description proceeds, when taken in connection with the accompanying drawings, in which:

Figure 1 is a side elevation of a portion of a finisher picker showing my invention applied thereto;

Figure 2 is a rear elevation of a portion of a picker and looking at the left-hand side of Figure 1;

Figure 3 is a vertical sectional view taken along line 3—3 in Figure 1;

Figure 4 is a vertical sectional view taken along line 4—4 in Figure 2;

Figure 5 is a vertical sectional view taken along line 5—5 in Figure 2;

Figure 6 is a vertical sectional view taken along line 6—6 in Figure 3;

Figure 7 is an end view of the other side of the machine from that shown in Figure 1;

Figure 8 is a rear elevation of a picker showing a modified form of my invention applied thereto;

Figure 9 is an enlarged detail view of the clutch releasing means shown in the left lower central portion of Figure 8 and being in a position the parts will occupy at the beginning of a lap roll;

Figure 10 is an elevation looking at the left hand side of Figure 8 and omitting certain conventional gear wheels for the sake of clearness;

Figure 11 is an elevation looking at the right hand side of Figure 8;

Figure 12 is an enlarged sectional view taken along the line 12—12 in Figure 11, showing the manner in which the clutch lever is connected to the hand trip lever;

Figure 13 is a sectional plan view taken along the line 13—13 in Figure 8;

Figure 14 is an enlarged sectional view taken along the line 14—14 in Figure 13;

Figure 15 is an enlarged sectional view taken along the line 15—15 in Figure 13;

Figure 16 is a rear elevation of the lower portion of the finisher picker showing another modified form of my invention applied thereto;

Figure 19 is a plan view similar to Figure 13 but taken along the line 19—19 in Figure 16;

Figure 20 is a transverse, sectional view taken along line 20—20 in Figure 19;

Figure 21 is a vertical sectional view taken along the line 21—21 in Figure 16;

Figure 22 is a vertical sectional view taken along the line 22—22 in Figure 16;

Figure 23 is a longitudinal, sectional view taken along the line 23—23 in Figure 16 with the chain omitted.

Figure 24 is a schematic view illustrating a lap roll positioned directly above a single driving roll;

Figure 25 is a schematic view illustrating a lap roll when wound by a pair of driving rolls, and also illustrating the distances and angles necessary for developing the mathematical formula for the rate of let-off of the lap roll.

Figure 17:
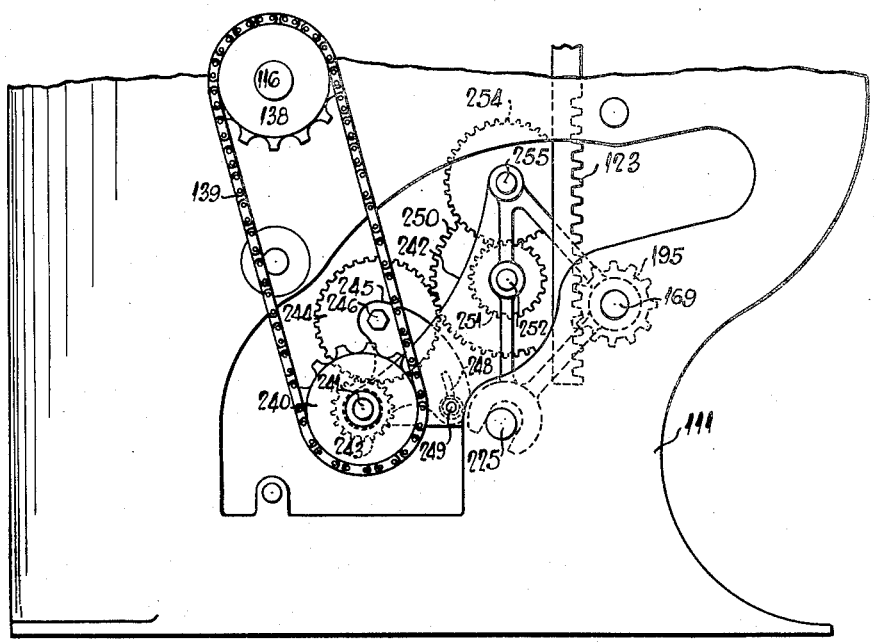
Figure 17 is an elevation looking at the left side of Figure 16.

Referring more specifically to the drawings, the numeral 10 denotes a samson or frame of a picker in which is mounted for rotation the feed motion shaft 11, it being evident that the other end of shaft 11 is mounted in another samson on the other side of the picker, which is not shown. Shaft 11 has fixedly mounted thereon a pinion 12 which is constantly rotated by shaft 11 when the machine is in operation. In the conventional structure, and on the other end of the machine from that shown in the drawings, shaft 11 is geared to conventional rolls 13 and 14, which have extending from each end thereof bearing pins 15 and 16, which are adapted to rotate in a direction denoted by the arrows in Figure 1 at all times as the shaft 11 rotates. The specific details showing how this is connected is not shown, because it is conventional in all machines, but it is evident that as these rolls rotate the lap 17a is formed around winding pin or arbor 17.

The pinion 12 also meshes with a feed roll gear 19 which is mounted on feed roll shaft 20. Shaft 11, which carries the pinion 12, is also rotatably mounted in knock-off lever 21, which is pivotally mounted as at 22. Lever 21 has its free end extending forwardly on the side of the picker and is slidably confined in a slot 23 of bracket 24. The free end of lever 21 is held in the position shown in Figures 1 and 2 by means of an upwardly extending lever 26, pivoted as at 26b, to bracket 24.

By referring to Figure 2, it is seen that lever 26 has a notch 26a cut therein and in which the lever 21 rests, and while it is in this position the pinion 12 will mesh with the gear 19, which is mounted on the feed roll shaft 20. When the knock-off mechanism, which will be presently described, operates the lever 26, this allows the lever 21 to fall downwardly in slot 23. Pinion 12 will also fall and become disengaged from the gear 19, thereby causing the feed rolls, which are connected to the shaft 20, to stop rotation, and this will cause the lap to break, since the rolls 13 and 14 will continue to rotate.

The shaft 20 has fixedly mounted thereon a conventional worm 27, which meshes with a worm gear 28 mounted on shaft 29. Shaft 29 has one end rotatably mounted in bracket 30 and its other end rotatably mounted in bracket 31 which is secured to the side of samson 10. On the left-hand end of shaft 29 (Fig. 1), is mounted a pinion 32 which meshes with an idler pinion 33, which in turn meshes with a pinion 34, both of said pinions 33 and 34 being rotatably mounted on bracket 31. Pinion 34 has a dog 34a loosely pivoted thereon, which is adapted to rotate with the pinion 34 and move the lever 26 in a clockwise manner about pivot point 26b in Figure 2. When the dog 34a rotates a slight amount from the position shown in Figure 2, it is seen that it will contact this lever and cause the notch 26a to move out from under the lever 21 and to allow the lever to fall, thereby causing the pinion 12 to become disengaged from the gear 19 to stop the feeding of the lap to the lap roll.

Dog 34a is restrained against movement in one direction by a pin 34b in pinion 34. When the dog 34a moves lever 26, the dog falls and therefore, is out of the path of lever 26 when the lever is moved to re-set position.

The picker is also equipped with conventional calender racks 37, only one of which is shown in Figure 1, but a similar one is at the other side of the machine as shown in Figure 7. These racks each have a head portion 38 and a rack portion 39, said rack portion 39 being adapted to mesh with pinion 40 mounted on each end of shaft 41, but only one pinion is shown.

Calender rack 37 is adapted to cooperate with a similar calender rack mounted on the other side of the picker and which holds the other end of the lap pin 17 in approximately the same position as shown in Figure 2. Heretofore, as the lap 17a has been formed on the lap pin 17, the lap pin would move upwardly and thereby raise the calender racks 27 upwardly. A frictional wheel was mounted on the shaft 41 with a suitable brake applying means applied to said wheel for supplying the proper amount of friction in order that the proper amount of downward pressure would be exerted on both ends of lap pin 17 by the rack heads 38 as the lap was being formed. As heretofore stated, this brake applying means has been unsatisfactory because of the variable working conditions under which this brake has had to operate, thereby making it almost impossible to procure lap rolls 17a of uniform compactness and size from day to day.

The structure thus far described is conventional, but it is deemed necessary to describe same in order to show how my invention is applied to this apparatus. Instead of using a conventional brake or frictional wheel for applying the proper amount of downward pressure on the lap pin or arbor 17, I have loosely mounted on shaft 41 a gear 45 having integral therewith a hub gear 46 which meshes with a larger gear 47, loosely mounted on a shaft 48. Gear 47 has integral therewith a hub gear 49 which, in turn, meshes with a gear 50 fixedly mounted on shaft 41. As the gear 45 rotates in a counter-clockwise manner in Figure 4, the hub gear 46 will likewise be caused to rotate, thereby causing gears 47 and 49 to rotate in a clockwise manner in Figures 4 and 5, which, in turn, will cause gear 50 to rotate shaft 41 in a counterclockwise manner in Figures 1 and 5. This will allow the pinions 40 to positively move the calender racks 37 upwardly as the lap is being formed.

The train of gears thus far described is driven by the lap roll 17a through means which will presently be described. As the lap rolls 17a and the lap pin or arbor 17 turns, the gears just described will likewise be rotated to cause the calender racks 37, or let-off means, to be raised automatically as the roll is being formed. Gear 45 is rotated by a pinion 52 which is fixedly mounted on the end of shaft 53, which is rotatably mounted in floating bearing 54 (Fig. 3). The other end of shaft 53 has fixedly mounted thereon a beveled gear 55 (Figs. 1 and 3), which meshes with another beveled gear 56 fixedly mounted on the lower end of a vertically disposed shaft 57.

The floating bearing 54 is fulcrumed as at 58 (Fig. 3), in a slot 59 cut in a bracket 60. Bracket 60 has its upper end mounted on a transverse shaft 61 (Figs. 1 and 2), and its lower end secured to transverse shaft 48. It should be noted that the bearing 54 has extending from the lower side thereof a projection 54a which is adapted to slidably fit into a slot between the cradle members 60a and 60b (Fig. 6), projecting from the side of bracket 60. The portion of floating bearing 54 which is disposed on the left-hand side of bracket 60 has a projection 54b extending downwardly therefrom, which likewise is adapted to fit into a slot formed by the cradle members 60c and 60d (Figs. 2 and 3), which are similar to the projections 60a and 60b just described. The lower side of 54b is sharpened and is adapted to be contacted by the horizontal portion of an L-shaped member 65 which is adjustably secured to one end of a lever 66 as at 65a.

The lever 66 is loosely mounted on shaft 48 and extends rearwardly of the machine. The left-hand end of lever 66, as shown in Figure 4, has a treadle portion 68 which is adapted to be contacted by the foot of the operator when it is desired to raise the pinion 52 out of engagement with the gear 45 so that the calender racks 37 can be moved upwardly or downwardly by merely turning the hand wheel 41a on the end of shaft 41. In order to secure sufficient upward movement of pinion 52 when treadle 68 is depressed, a cam surface 65b is provided on member 65. This may be made as shown or the member 65 may be bent to provide this cam surface. When pinion 52 is disengaged from the gear 45, an easy turning movement of the shaft 41 can be effected, since these gears will not be connected to the other portions of the machine.

In order to cause the gear 52 to normally remain in engaged position with the gear 45, a suitable spring 69 is mounted in the upper portion of slot 59 and normally engages the top portion of bearing 54 and forces it downwardly at all times. When pressure is applied on the left-hand end of lever 66 in Figure 4, the gear 52 is raised upwardly and disengaged but the bevel gear 55 on the right-hand end of shaft 53 is caused to press tightly into engagement with the pinion 56.

A suitable tension spring 70 has one end thereof secured to the lower side of projection 54a and its other end secured to bracket 60 to normally hold the right-hand end of bearing 54 in the position shown in Figure 3, and to cause the gears 55 and 56 to mesh. It should also be stated here that the right-hand end of floating bearing 54 is in its lowermost position since the cradle members 60a and 60b limit this downward movement, but when the pinion 52 is raised out of engagement with gear 45 the shaft 52 pivots about gear 55. The lower end of shaft 57 is rotatably mounted in a bracket 72 which is adjustably mounted on the knock-off lever 21.

Hole 72a is provided in bracket 72 through which the shaft 53 and the pinion 55 are adapted to project. The upper end of shaft 57 is rotatably mounted in bearing portion 74 of bracket 75. Bracket 75 is secured to the head portion 38 of one of the calender racks 37 and is held to this rack by means of the pin 76 which projects through the head of said rack.

It is, therefore, seen that bracket 75 and its associated parts move upwardly or downwardly with the racks 37. The upper end of shaft 57 has slidably keyed thereon a beveled gear 77 which is slidably secured on this shaft by any suitable means such as a key 78 which is adapted to slide up and down in a key-way 57a cut in shaft 57. Gear 77 normally meshes with another beveled gear 80 fixed on stud shaft 81 projecting out from bearing 75. In order to cause gear 77 to mesh with gear 80 at all times, a groove 77a is cut in hub portion of gear 77 into which the horizontal portion of L-shaped member 82 is adapted to fit, the lower end of said L-shaped member 82 being secured as at 83 to bearing portion 74.

By providing this member 82 the beveled gear 77 will be allowed to rotate with the shaft 57 and at the same time be held downwardly on bearing 74 to mesh with bevel gear 80, since the horizontal portion of member 82 will not allow the gear 77 to move upwardly and become disengaged. The stud shaft 81 also has rotatably mounted thereon a gear 85 which is integral with bevel gear 81 and is adapted to turn therewith. This gear meshes with another gear 86 fixedly mounted on lap pin 17.

It is therefore, seen that as the lap pin or arbor 17 is rotated to form a lap roll 17a, the pinion 86 is likewise caused to rotate which in turn will rotate gear 85, beveled gears 80 and 77, shaft 57, beveled gears 56 and 55, shaft 53, gears 52, 45, 46 47, 49 and 50, thereby rotating shaft 41 and allowing the calender racks 37 to move upwardly simultaneously with the forming of the lap.

When the lap roll 17a has the desired length of web thereon, then the knock-off means, which has been previously described, will be operated on dog 34a and allow the lever 21 to fall. When lever 21 falls the bracket 72 will likewise fall and cause the beveled gear 56 to become disengaged from the beveled gear 55, and at the same time will cause the pinion 12 to become disengaged from the feed roll pinion 19. With gears 55 and 56 disengaged, it is evident that it is possible to rotate the hand wheel 41a manually and cause the racks 37 to be moved upwardly so that the lap pin or arbor 17 with the lap roll 17a thereon may be removed and another lap pin or arbor reinserted for starting a new lap roll.

When this roll is started, the lap pin or arbor 17 is placed in starting position again and the lap is gathered around the pin to cause the same to start rolling therearound. When the lap pin 17 is first placed on the rolls 13 and 14 the calender rack heads 38 and their associated parts are a substantial distance above the lap pin; therefore, it is necessary to lower the calender racks by means of the hand wheel 41a. In order to do this, the operator applies pressure on the end of lever 66 thereby disengaging the gear 52 from the pinion 45. Before doing this, however, he moves the knock-off lever 21 upwardly to the position as shown in Figures 1 and 2, which will cause gears 55 and 56 to mesh. None of the parts in the lower portion of the machine will be operated at this time, because they are driven directly from the lap roll, and since gear 85 is not in mesh with gear 86, the parts will remain stationary; however, the rolls 13 and 14 are being rotated, the lap 17a is being formed, but no pressure is being applied to the top of lap pin 17.

As the hand wheel 41a moves the calender racks 37 downwardly, immediately at the point when the gear 85 falls into engagement with the gear 86 on the lap pin 17, the operator relieves the pressure on the end of lever 66 to allow the pinion 52 to engage the pinion 45 simultaneously with the engagement of the pinion 85 with the pinion 86.

It is necessary for the operator to cause these pairs of gears to engage simultaneously, or approximately so, in order to effect a smooth operation of the machine. It is also evident that the gear 85 can be varied to conform to the various sizes and densities of lap rolls which are desired. The thickness of the lap being formed into lap rolls, the smaller the pinion 86 will be, as this pinion will be selected from a set of different sizes, there being a size for each thickness of lap.

By this arrangement and with a given thickness of lap and the proper sized pinion 86 or 85, and by placing of the proper sized pinions 32 and 33, then a predetermined number of rotations of the lap pin will result, and at the same time, the feeding of the lap will stop and the lap roll will be finished. The lap roll will thus have a given size and a given yardage, and will have a uniform density as the pressure on the roll during its formation will be governed by the rotation of the lap roll and not by questionable friction means.

Figures 8 to 15 inclusive show a modified form of the invention in which the let-off of the calender racks is controlled by a positively driven shaft in the picker. In this form the numerals 110 and 111 denote suitable end frames of a picker between which are mounted calender rolls 113, 114, 115 and 116 and also fluted calender rolls 117 and 118. A lap 119, after emerging from the beater chamber of the picker, is drawn first between rolls 113 and 114 and then between rolls 114 and 115 and then between rolls 115 and 116 and then onto an arbor or lap pin 121 on which lap roll 20 is formed by turning movement of the lap roll by frictional contact with calender rolls 117 and 118. The lap pin 121 is engaged at its ends by the upper portion or the heads of calender racks 122 and 123. The lap roll in the drawings is shown practically completed and ready to be doffed, therefore, the racks 122 and 123 have been raised or let off accordingly, but when the lap roll is first started the calender racks 122 and 123 are in a much lower position.

The arbor or lap pin 121, at the beginning of formation of the lap roll, is inserted in crotches 124 and 125 which are disposed in the upper portions of the side frames 110 and 111. The lap is then started around the arbor or lap pin 121 and due to the constant rotation of the calender rolls 117 and 118 in the machine, the lap builds up in a scroll formation until it is finished. As the lap roll builds up, the downward pressure exerted upon this roll by means of the calender racks should be maintained practically constant, therefore, the calender racks must be allowed to move upwardly at a decreasing predetermined variable rate of speed, proportional to the length of lap wound on the pin at a given time.

The end of roller 115, as shown in Figure 11, has secured thereon a gear 128 (Figure 11) which meshes with a smaller gear 129 which is fixedly secured on shaft 130, said shaft being supported by trip lever 131. The lever 131 is pivoted to the side of frame 110 as at 132 and acts as a trip lever for causing gear 129 to mesh with gear 128 at the desired times, and also for causing these gears to be disengaged when a suitable trip mechanism is operated. The shaft 130 extends transversely of the picker and is driven by the conventional picker driving mechanism.

The power transmitted to shaft 130, gear 129 and gear 128 causes roll 115 to rotate in a clockwise manner in Figure 11. It will be noted that the other end of the roll 115 (Figure 10) has a gear 133 secured on the end thereof which meshes with gear 134 which is secured on the end of roll 114. Gear 134 also meshes with gear 135 which is secured on the end of roll 113. It is seen that this train of gears will cause the lap 119 to be fed between rolls 113, 114, 115 and 116 and onto the lap roll 120. The roll 116 is likewise driven by the gear 133 and the end of this roll has a gear 137 fixedly secured thereon which meshes with gear 133. Although a driving mechanism is not shown for rolls 117 and 118 upon which lap beam 120 is rotated, it should be stated that the driving mechanism for these rolls is conventional and move in timed relation to the driving rolls 113, 114, 115 and 116.

The end of roll 116 also has fixedly secured thereon a sprocket 138 upon which is mounted sprocket chain 139, said chain being also mounted on a second sprocket 140 which is mounted on stud shaft 141. This sprocket has fixedly secured thereto a gear 142, both gear and sprocket being adapted to rotate upon stud shaft 141. The gear 142 meshes with another gear 143 which is fixedly mounted on shaft 144, said shaft being rotatably mounted in an arm 145. This arm has one end rotatably mounted upon stud 141 and has its free end adjustably secured to the side of framework 111 by means of bolt 146 penetrating arcuate slot 147 in the end of said arm.

A pinion 149 is removably secured on the other end of shaft 144 in order that it may be replaced by a larger or smaller pinion when it is desired to vary the gear ratio between the gear 143 and the other gears of the machine. This ratio is, of course dependent upon the density of the lap rolls desired to be wound and also the condition of the fibres which are being processed.

Gear 149 is adapted to mesh with another gear 155 which is loosely mounted upon shaft 156. The gear 155 has a hub 157 integral therewith which, in turn, has a serrated clutch face which is adapted to mesh with another serrated clutch face on hub 158, said hub 158 being mounted for longitudinal movement on shaft 156 by means of a key way 159. Clutch hub 158 has a peripheral groove 160 cut therein which is engaged by suitable pins 161 extending from a forked lever 162. This forked lever has its upper end secured to pin 163 and this pin is rotatably mounted in a suitable bracket 164. The pin 163 has also secured thereto an upwardly extending arm 165 which arm has pivoted thereto, as at 166, a cam 167.

When the calender racks are in lowered position, and the lap is started, the cam 167 is then engaged by a cam 168 which is fixedly secured on a hand wheel shaft 169. It is evident that upon setting the apparatus at the beginning of a lap roll by manual rotation of shaft 169 in a clockwise manner in Fig. 11, that cam 168 will engage cam 167 and thereby cause levers 162 and 165 to rotate in a clockwise manner, in Figure 8, and cause the clutch faces of hubs 157 and 158 to engage each other. These clutch faces are normally pressed apart from each other to a disengaged position by means of a compression spring 171. The longitudinal movement of hub 158 on shaft 156 and its associated parts is limited however by a suitable collar 172 which is fixedly secured on the shaft.

Hand wheel shaft 169 is adapted to make a complete revolution each time a lap roll is formed; consequently, cam 168 will not engage cam 167 as shown in Figures 8 and 9 except at the beginning of the winding of the lap roll 120. When these two cams engage each other, lever 165 is rotated to a position where its upper end will be latched. The upper end of the lever 165 is then held by a latch 176 which has a restricted portion 177 integral therewith, both of said portions being confined in one end of a lever 178. The restricted portion 177 has a compression spring 179 confined therearound by means of the enlarged lower portion of latch 176 and by the nut 180 which is threadably secured in the upper side of the end of lever 178. The restricted portion 177 has a nut 177a threadably secured on its upper end to limit the downward movement of the latch.

After the lever 165 is placed in latched position and the clutch faces are caused to be engaged, the lap 120 is started around the lap pin 121. In the meantime, the shaft 169 is constantly revolving so as to allow the racks 122 and 123 to move upwardly; consequently the cam 168 will move away from the cam 167 under pressure of the lap roll but the clutch faces will be held in latched position by means of the latch 176.

The lever 178 is pivoted intermediate its ends as at 184 to the upper portion of a bracket 185, said bracket extending upwardly from a base 186 which is secured to the floor of the building in which the apparatus is placed. The other end of lever 178 is hinged as at 188 to trip lever 131 (Figures 8, 11 and 12).

During the winding of the lap roll, the free end of the trip lever 131 is held in an elevated position as is shown in Figures 8 and 11, by means of a lever 190 which is pivoted as at 191 at its lower end to a bracket 192. This bracket 192 is secured to the side frame 110 and has a slot 193 therein, in which the end of lever 131 is allowed to have a limited pivotal movement about the point 132.

It will be noted that one edge of lever 190 has a notch 190a therein which supports lever 131 in elevated position (Fig. 8), but it will also be noted that means are provided for causing lever 190 to rotate in a clockwise manner in Figure 8 about the pivot point 191 to allow lever 131 to drop downwardly in the slot 193. The means for tripping this lever 131 at the proper time comprises a projection 190b (Figure 11), which extends from the side of lever 190, and a dog 200 which is pivotally secured to a gear 201, said gear being rotatably mounted in bracket 202 which is secured to the side frame 110.

The gear 201 is driven by means of a replaceable conventional idler gear 204 which is also mounted on the bracket 202 and this gear is driven by a gear 205 secured on the end of a shaft 206. The other end of shaft 206 has a gear 207 secured thereon, which meshes with a worm 208 secured on the hub of roll 115.

The parts 200 to 209 are conventional and are so timed with relation to gear 128 that the gear 201 will make one complete revolution during the winding of a lap roll and, consequently, cause the dog 200 to engage the projection 190b and rotate the lever 190 in a clockwise manner in Figure 8 to cause the hand trip lever 131 to fall. When this is done, gear 129 will be disengaged from gear 128 (Figure 11) to stop the rolls 113 to 118 inclusive. At the same time, the lever 178 will be rotated in a clockwise manner in Figure 8, about the pivot point 184, under weight of arm 131, thereby causing the left hand end thereof to move upwardly and release the upper end of lever 165. Upon this release the compression spring 171 will move the clutch faces of hubs 157 and 158 apart from each other.

It will be noted that the hand wheel shaft 169 has pinions 194 and 195 fixedly secured thereon which mesh with the gear teeth disposed in the lower end of calender racks 122 and 123 respectively. Therefore, when the clutch faces of hubs 157 and 158 are disengaged the shaft 169 can be turned by means of a hand wheel 196, which is secured on the end thereof. This is done in order to lower the calender racks to the proper position where a new lap roll can be started. This lowering can be effected without turning any of the gears 133, 134, 135, 137, 143, 149, or 155, thereby making the restoration of the machine to normal position less difficult.

As has been stated, the motion transmitted from the shaft 130 to the gear 155 through the train of gears and sprockets just described, is delivered to the shaft 156 through the clutch faces of hubs 157 and 158. The shaft 156 is rotatably mounted in the base member 186 and side frame 111. A sprocket 210 is fixed on shaft 156 and has a sprocket chain 211 mounted thereon, one end of said sprocket chain being secured at 212 to a shaft 213 (Figure 15). The shaft 213 has spaced disks 214 and 215 secured thereto which form a reel for the sprocket chain 211 when it is built up or wound around the shaft in between these flanges. The thickness of the chain is proportional to the thickness of the lap so that an equalized relation is produced between the windings of the chain and the windings of the lap. This relation may be varied by the change gear 149.

The other end of chain 211 is secured as at 216 to a flanged spool 217 which is loosely mounted around the shaft 213. (Fig. 14.) This spool has one end of a torsion spring 218 secured thereto at 219, the other end of said torsion spring being secured to the base member 186 at 220, (Fig. 8). When practically all of the chain 211 is wound between disks 214 and 215 as shown in Figure 15, the torsion spring 218 has been wound sufficiently to cause spool 217 to rotate and draw the chain from between flanges 214 and 215 and onto spool 217. The spring winds the chain onto spool 217 as the calender racks 122 and 123 are being lowered by hand wheel 196 prior to the winding of a new lap roll.

During the let-off of the calender racks 122 and 123, the chain 211 is drawn from the spool 217 and is automatically taken up on the reel formed by disks 214 and 215. It is seen from the foregoing description that the shaft 156 is connected to conventional feed rollers 113, 114, 115 and 116 through members 135 to 158 inclusive, and this shaft is allowed to rotate in timed relation to the rotation of the feed rolls. The rotation of the shaft 156, in turn, serves as a brake to retard the let-off, or upward movement of calender racks 122 and 123 through a connection which will presently be described. The upward pull of the calender racks would rotate shaft 156 much faster than its normal rate were it not for the fact that this shaft is directly connected to the feed rolls 113, 114, 115 and 116 which are driven at a constant rate.

When a lap 120 is being formed, the shaft 213 will be rotated in a counter-clockwise manner in Figure 14, due to the upward pull of the racks, the rate of rotation of said shaft 213 being controlled by chain 211 and sprocket 210 which sprocket is fixed to shaft 156. This upward pull will cause the gear 221, which is also fixedly secured on shaft 213 to be rotated by a gear 222. Gear 222 has integral therewith a smaller gear 223, both of said gears 222 and 223 being rotatably mounted on hand wheel shaft 169. The gear 223 meshes with gear 224 which is secured on a cross shaft 225, and the gear 224 likewise has a smaller gear 227 integral therewith. Both gears 224 and 227 are rotatably mounted on shaft 225. The gear 227 meshes with a gear 228 which is fixedly secured as at 229 to the hand wheel shaft 169 (Fig. 8).

It is therefore, seen that when clutch faces of hubs 157 and 158 are placed in engaged position, and the picker is started, the rotation of shaft 156 will begin. With the clutch faces engaged, the shaft 156 will be connected to the feed rolls 113, 114 and 115, consequently the chain 211 can transfer from one spool to the other only as the rotation of shaft 156 permits it to do so. As has been stated, these clutch faces are placed in engagement with each other when the calender racks have been moved to lowered position and a lap is started on the lap pin. As the restraining members 135 to 159 inclusive allow the shaft 156 to rotate at a constant rate of speed during the winding of a lap roll, the sprocket chain 211 will be wound onto the spool between disks 214 and 215 due to the upward pull of racks 122 and 123. The shaft 213, on which disks 214 and 215 are mounted, is directly connected to the racks through gearing 221 to 228.

It should be further noted that at the beginning of the formation of the lap roll, the greater portion of the chain 211 is disposed on reel 217. In the present showing of the drawings, this is not the case, since the lap roll is almost ready to doff and thus the chain 211 will be almost entirely removed from this particular spool and of course, the other portions of the chain will be disposed between disks 214 and 215. The rotation of the shaft 213 will permit rotation to the hand wheel shaft 169 and thereby allow upward movement of the calender racks 122 and 123 as the lap roll increases in diameter. Since the chain is wound between the disks 214 and 215 to an equalized ratio and this ratio is proportional in every respect to a cross section of the finished lap roll, it is evident that as the chain is built up between disks 214 and 215 the size of the chain windings will increase thereby causing the rate of movement at which the calender racks 122 and 123 move upwardly to gradually decrease as the lap gradually increases in size.

The roll 116 controls the length of lap 119 fed to the lap roll and this roll is also connected to calender racks 122 and 123 through a train of gears heretofore described permitting correct ratio of upward travel of the racks during the winding of a lop roll.

It should be borne in mind that the rotation of the chains and sprockets disposed between the calender racks and the positively driven shaft 156 is caused by the upward pull of the compressed lap 120. The roll 116, merely controls the rotation of shaft 156 which, in turn, controls the let-off of lap roll 120 and prevents the same from releasing too fast.

Figures 16 to 23 inclusive, show a slightly modified form of the invention in which the arrangement of the parts has been revised so that the entire apparatus will be supported by the finisher picker instead of by the floor and picker as in the preceding form.

Also, an additional clutch has been provided between the reels and the hand wheel to enable the operator to more easily raise the calender rack after the lap has been wound in order that the lap and lap pin may be removed. In this form, the lower portion of chain 139 is adapted to be mounted upon a sprocket 240, which sprocket is fixedly secured on the end of a shaft 241, said shaft being rotatably mounted in the lower portion of a bracket 242. This bracket is normally supported by the hand wheel shaft 169 and the cross shaft 225.

A pinion 243 is fixedly secured on the other end of shaft 241 and this pinion is adapted to mesh with a gear 244. The gear 244 is rotatably secured to an arcuate member 245 as at 246, said arcuate member having one end thereof rotatably mounted around the shaft 241. The arcuate member has an arcuate slot 248 cut therein which is adapted to be penetrated by a bolt 249. This bolt also penetrates a portion of bracket 242, to hold the arcuate member in adjusted position. It is seen that by loosening the bolt 249 in Figure 17, the arcuate member 245 may be rotated about the shaft 241 to cause the gear 244 to assume a different size from that shown in the drawings, the gear 244 can be rotated so that it will mesh with the change gear at all times.

The change gear 250 has secured thereto a smaller gear 251 both of said gears being rotatably mounted around stud shaft 252 which, in turn, is secured in the bracket 242. Meshing with the smaller gear 251 is another gear 254 which is fixedly secured on shaft 255. This shaft has one end thereof rotatably mounted in the upper portion of bracket 242 with its intermediate portion rotatably mounted in the upper portion of bracket 256, and its extreme right-hand end rotatably mounted in bracket 257. The brackets 256 and 257 are very similar and both are supported by the same shafts, namely, the hand wheel shaft 169 and the cross shaft 225.

The shaft 255 has a clutch hub 260 slidably keyed thereon by means of key ways 261. The right-hand portion of the clutch hub has integral therewith a clutch face 262 which meshes with another clutch face 263 projecting from the side of a sprocket 264, said sprocket being rotatably mounted on the shaft 255. A chain 265 is mounted on the sprocket 264, one end of this chain being secured around the hub of take-up pulley 266 and its other end fixedly secured to the hub of clutch pulley 267. The pulley 267 has secured to the right-hand face thereof as shown in Figures 16, 19 and 23, a clutch face 268, which normally engages clutch face 269 which is slidably keyed upon the hub of gear 270 by means of key ways 271. The gears 270, as well as the pulleys 266 and 267, are rotatably mounted on shaft 272, said shaft being supported by the brackets 256 and 257. The take-up pulley 266 has secured to one side thereof a hub 266a, in which is mounted a spring 273. One end of this spring is secured to the interior of the hub 266a as at 274 and its other end is secured to the adjustment hub 275 as at 276 (Figure 20). The hub 275 is freely mounted on the shaft 272 and has a rim portion 277 which has a plurality of spaced holes 278 therein into which the smooth end of a pin 279 is adapted to be inserted to hold the hub and maintain the desired tension on the spring 273. (Figs. 16, 19 and 22.) The pin 279 is threadably secured in the bracket 256 at a point slightly above the end of shaft 272. When it is desired to increase the normal tension upon the coiled springs a suitable lever is inserted in radially disposed holes 280 in the rim of the hub 275 and clockwise rotation is imparted to this hub in Figures 20 and 22. Of course, it is necessary to remove the pin 279 before attempting to rotate the hub 275 to a different position.

The gear 270 replaces the gear 221 in the preceding form and this gear is adapted to mesh with the gear 222 which is connected to the calender racks 122 and 123 through a train of gears 222, 223, 224, 227 and 228, which have been described in the preceding form.

Figure 18:
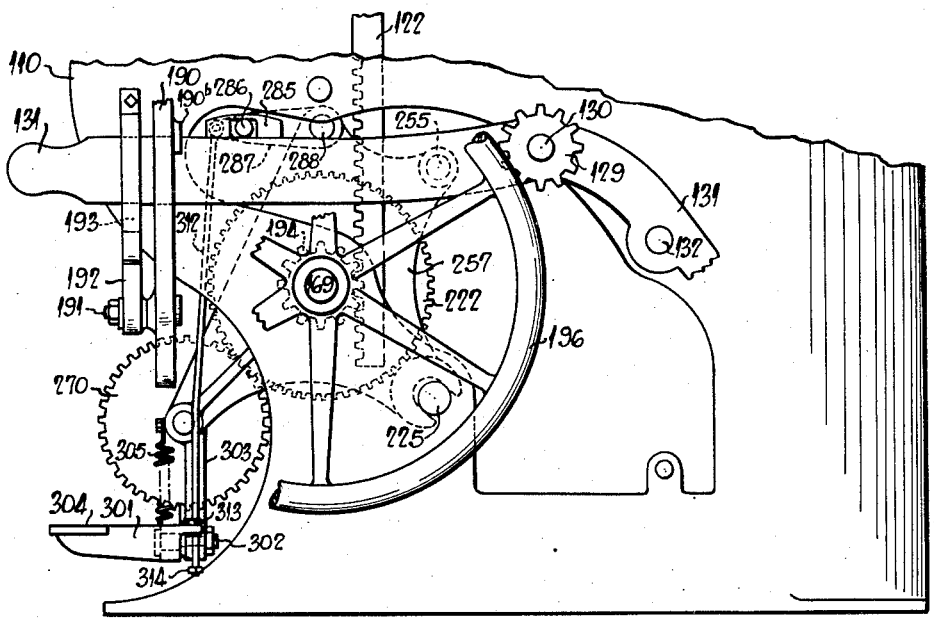
Figure 18 is an elevation looking at the right side of Figure 16.

Since the gear arrangement between the gear 270 and the calender racks is identical to that of the preceding form, it naturally follows that the upward pressure exerted by the lap roll upon the calender racks will likewise produce a clockwise rotation of the gear 270, Figure 18. This of course will impart a corresponding rotation to the shaft 272 and to the pulley 267 which will cause the sprocket 264 to be rotated in a counter-clockwise manner in Figure 20. The counter-clockwise rotation of sprocket 264 will have a tendency to rotate the shaft 255 in a like manner in Figure 17, which, in turn, will impart a clockwise rotation to the shaft 241 and its associated sprocket 240, through a train of gears comprising gears 240, 243, 244, 250, 251 and 254. It should be kept in mind that the rotation of these shafts is produced by the upward pressure of the lap 120 upon the arbor or lap pin 121 which, in turn, transmits its upward pressure to the calender racks 122 and 123. The train of gears are connected to a constantly driven shaft of the machine such as 116 through the chain 139 so that this shaft may act as a hold-back or let-off mechanism to prevent the calender racks from moving upwardly too fast.

As stated in the preceding form, when a predetermined length of lap has been wound around the lap pin 121, it is necessary to cut off the feeding mechanism. Since this is accomplished by the dropping of the hand lever 131, I have provided means operable upon the falling of this lever for disconnecting of the clutch faces 262 and 263. When these clutch faces are disengaged, the calender racks 122 and 123 will be released and allowed to move upwardly under the upward pressure of the lap 120. In other words, the train of gears disposed between shaft 255 and the sprocket 240 will offer no resistance to the let-off mechanism after the clutch faces 262 and 263 have been disengaged. In order to provide this disconnecting means, I have secured a plate 285 on top of the hand lever 131, and beneath this plate, one end of a pin 286 is freely mounted. The other end of pin 286 is secured in the end of lever 287 which in turn, is fixedly secured on the end of cross shaft 288, said shaft being mounted for oscillation in the upper portion of brackets 256 and 257. The intermediate portion of the shaft 288 has a lever 289 secured thereon, the outer end of which has the upper end of a downwardly extending link 290 secured therein. The lower end of link 290 is secured in the right-hand portion of lever 291 which is pivoted as at 292 to the bracket 256 (Fig. 16).

The lever 291 has integral therewith an upwardly extending yoke 293 which fits astride a grooved portion 295 of the clutch hub 260. This portion has a groove 296 therein into which pins 297 are adapted to fit. Upon the falling of the hand lever 131 it is evident that the shaft 288 will be rotated in a counter-clockwise manner (Fig. 18), thereby causing the link 290 to be moved upwardly in Figures 16 and 21, to rotate the lever 291 in a counter-clockwise manner about the pivot point 292. This movement will move the clutch hub 260 and its associated parts to the left in Figures 16 and 19, thereby disengaging the clutch faces 262 and 263.

When the lap 120 has been completed and the clutch faces 262 and 263 are disengaged, the calender racks are pushed upwardly by the expansion of the compressed lap, and move the racks upwardly an additional amount. It should also be kept in mind that upon the completion of the lap, the coiled spring 273 is wound very tightly; consequently it would be very difficult to turn the hand-wheel until the tension upon this spring is released. Therefore, I have provided a clutch disposed between the clutch pulley 267 and the calender rack. This clutch comprises clutch faces 268 and 269 which have been previously described. The clutch face 269 is adapted to be moved to the right by means of a suitable forked yoke 300 which normally engages the hub of this clutch face. This yoke is integral with the upstanding leg of foot lever 301 which lever is pivoted as at 302 to an arm 303 which extends from the lower portion of bracket 257, see Figure 16. The horizontal leg of lever 301 has a treadle portion 304 upon which the operator can place his foot when it is desired to rotate the lever 301 in a clock-wise manner and thereby disengage the clutch faces 268 and 269. Ordinarily, however, the foot lever 301 is automatically operated simultaneously with the falling of lever 131 since a vertically disposed rod 312 has its upper end pivotally connected to the end of lever 287 and its lower end penetrating lever 301. This rod has spaced nuts 313 and 314 disposed above and below said lever so that upon the falling of lever 131 the upper nut 313 will push the lever 301 downwardly and disengage the clutch. A spring 305 has one end thereof engaging the horizontal leg of the lever 301 and its other end secured to the bracket 257 in order to normally hold the clutch faces in an engaged position.

Upon the operation of the foot lever 301, the clutch faces are disengaged and the spring 273 is allowed to wind the chain 265 from the pulley 267 onto the take-up pulley 266. At this time the tension upon the spring is relieved and the operator may rotate the hand wheel shaft 169 without having to overcome the stored-up energy in the spring 273. After a finished lap roll has been removed, an empty pin 121 is placed in crotches 124 and 125 in Figures 10 and 11, and the calender heads are lowered upon this pin.

It is necessary to cause the clutch faces 262 and 263 to become engaged immediately upon the lowering of the calender heads 122 and 123 to this lowermost position, so that the let-off will be regulated from the beginning of the winding by the new lap roll. Since the hand wheel 196 will rotate the shaft 169 in a counter-clockwise manner in Figure 22, when the racks are being lowered, I have provided an arm 306 which is fixedly secured to the shaft. When the lap is completed this arm is substantially in the position as shown in Figure 22, however, when the racks are lowered, the shaft is rotated approximately 360 degrees in a counter-clockwise manner from the position shown in this figure. It is seen, that upon this counter-clockwise rotation, upon the lowering of the calender racks, the upper end of this arm will engage the lower right-hand corner of lever 307, which lever is fixedly secured around shaft 288. When the end of the arm 306 makes this contact the lever 307 will be rotated in a clockwise manner in Figure 22 thereby causing link 308 to be raised. Since the link 308 has its lower end secured in the left-hand portion of bracket 291, it is evident that this bracket will be rotated in a clockwise manner in Figure 16, thereby causing clutch faces 262 and 263 to become immediately engaged when the calender racks 122 and 123 reach their lowermost position.

Lever 307 has a slot 307a therein which the upper end of the link 308 is adapted to penetrate. This will allow shaft 288 to rotate the lever 307 when the clutch faces 262 and 263 are disengaged without interfering with the link 308 in any manner. For example, if the lower end of link 308 should become bound or caught in the left-hand end of bracket 291, the rotation of the shaft 288 or the lever 307 would not be prevented in any manner.

It should also be noted that the spring 309 is disposed around the lower portion of link 308 and below the left-hand portion of lever 291. This spring provides the necessary resiliency during the restoration of the clutch faces 262 and 263 to an engaged position. When the clutch faces 262 and 263 have once been engaged, they are held in this position by virtue of the let-off pressure exerted between their respective teeth, and therefore, no spring is necessary for holding the clutch faces in engaged position.

In the drawings and specification there has been set forth a preferred embodiment of the invention, and although specific terms are employed, they are used in a generic and descriptive sense only, and not for purposes of limitation, the scope of the invention being set forth in the appended claims.

In order to distinctly define the action of the above described let-off mechanism, the mathematical formula expressing the rate of lap let-off for the lap roll 120 will be derived. This mechanism is designed to satisfy the equation at all times, regardless of what the diameter of the lap roll may be.

Rate of let-off $F_1$ for a single lap roll located vertically above center of a driving roll:

$a$ = area of end of lap (1) $$a = \pi r^2$$

$r$ = radius of lap, by differentiation with respect to time (see Figure 24)

(2) $$\frac{da}{dt} = 2\pi r \frac{dr}{dt}$$

$\frac{da}{dt}$ = rate of increase of area of end of lap (3) $$\frac{da}{dt} = speed \times thickness \quad s=speed \quad z=thickness$$

$\frac{dr}{dt}$ = rate of increase of radius of end of lap (4) $$\frac{dr}{dt} = F_1 = \text{rate of lap let-off for a single lap roll located vertically above center of driving roll}$$

From Equation 2

$$\frac{dr}{dt} = \frac{1}{2\pi r}\frac{da}{dt}$$

From Equation 3

(5) $$\frac{dr}{dt} = \frac{zs}{2\pi r} = F_1$$

Equation 5 is true in the case of one lap roll vertically above center of driving roll. When two rolls 117 and 118 are used the equation will vary as shown in Figure 25: Let $F$ = rate of lap let-off for two driving rolls. Then from sketch it will be seen that (5a) $$F = F_1 \sin \alpha$$

$r$ = radius of lap roll 120
$c$ = radius of rolls 117 and 118
$y$ = center distance between rolls 117 and 118
$\alpha$ = angle between line through centers of rolls 117 and 118 and line through centers of rolls 117 and 120.

(6) $$\cos \alpha = \frac{\frac{y}{2}}{c+r} = \frac{y}{2(c+r)} \quad \text{Figure 25}$$

(7) $\sin^2 \alpha + \cos^2 \alpha = 1$ (by trigonometry)

(8) $\sin \alpha = \sqrt{1-\cos^2 \alpha}$

Substituting Equation 6 in (8)

(9) $$\sin \alpha = \sqrt{1 - \left[\frac{y}{2(c+r)}\right]^2}$$

(10) $$F = F_1 \sqrt{1 - \left[\frac{y}{2(c+r)}\right]^2}$$

Substituting Equation 9 in Equation 5a

(11) $$F = \frac{zs}{2\pi r}\sqrt{1 - \left[\frac{y}{2(c+r)}\right]^2}$$

Substituting Equation 5 in Equation 10

The formula derived in Step 11 is universal in its application to one or two friction rolls for driving the lap. In the first case, where the lap roll is mounted directly over the vertical center line of a single friction roll $y$ will equal 0. In the second case where the rolls 117 and 118 are separated a variable is introduced into the rate of let-off. This variable results from the fact that the initial layers wound on the lap pin tend to force it up out of the crotch between the two rolls at a more rapid rate in the beginning than is maintained after the lap roll has attained a substantial diameter. It will be noted that in the first instance, the increase in diameter of the lap is identical with that of a spiral while in the second instance, the variable, due to increase in diameter and separation of rolls 117 and 118, produces a rapid rise in the beginning—compensated for in the formula; thus the formula meets both conditions. From the above formula the rate of let-off of the lap roll can be computed at any stage of the rolling. It is evident when substituting in the formula that when the lap is just started that the rate of let-off will be at its maximum but as the diameter increases the rate of let-off approaches zero.

I claim:

1. In a machine for forming lap rolls of fibrous material and having a suitable lap pin and also having a friction roll for driving the lap roll by frictional contact with the exterior of the lap roll and having means for applying pressure to the lap roll as the same is being formed, means driven by the lap pin for moving the pressure applying means a predetermined amount upon each revolution of the lap roll, and means for disconnecting the lap pin from the pressure applying means for re-setting the pressure applying means upon completion of a lap roll.

2. In a machine for forming lap rolls of fibrous material provided with a lap pin for receiving the lap roll and having a pair of calender racks for applying pressure to the lap pin as the lap roll is being formed and also having a pair of friction rollers driven by the machine and on which the lap roll rests while it is being formed, a rack on each calender rack, a transversely disposed shaft having pinions thereon engaging said racks, driving connections between the lap pin and said transversely disposed shaft, whereby upon each revolution of the lap pin the calender racks will be raised, thus applying uniform pressure to the lap roll during its formation.

3. In a machine for forming lap rolls of fibrous material and having a lap pin for receiving the lap roll and having a pair of calender racks for applying pressure to the lap pin as the lap roll is being formed and also having a pair of friction rollers driven by the machine and on which the lap roll rests while it is being formed, a rack on each calender rack, a transversely disposed shaft having pinions thereon engaging said racks, driving connections between the lap pin and said transversely disposed shaft, and means for disconnecting said driving connection from said transversely disposed shaft, whereby upon each revolution of the lap pin, the calender racks will be raised, thus applying uniform pressure to the lap roll during its formation.

4. A finisher picker having means for feeding a lap therethrough, a pair of friction rolls driven by the picker, a lap pin on which a lap roll is formed, said lap roll being adapted to rest on said friction rolls, a pair of calender racks for engaging the ends of the lap pin for applying pressure to the lap roll while the same is being formed, driving connections between the lap pin and said calender racks whereby the calender racks will be moved a predetermined amount upon each revolution of the lap roll regardless of the size of the lap roll to preserve thereby a uniform pressure on the lap roll during its formation.

5. A finisher picker having means for feeding a lap therethrough, a pair of friction rolls driven by the picker, a lap pin on which a lap roll is formed, said lap roll being adapted to rest on said friction rolls, a pair of calender racks for engaging the ends of the lap pin for applying pressure to the lap roll while the same is being formed, driving connections between the lap pin and said calender racks whereby the calender racks will be moved a predetermined amount upon each revolution of the lap roll regardless of the size of the lap roll to preserve thereby, a uniform pressure on the lap roll during its formation, and means for disconnecting the driving connections between the lap pin and the calender racks so the calender racks can be manually reset for the beginning of another lap roll.

6. In a finisher picker for fibrous material, means for feeding a web therethrough, a pair of rollers driven by the picker and adapted to receive a lap pin having the end of the web wound thereon, a pair of calender racks engaging the ends of the lap pin for applying pressure to the lap pin so the rollers can rotate the lap pin to form a lap roll thereon, a pinion secured on one end of the lap pin, a second pinion mounted for rotation on one end of a calender rack, and engaging said first pinion a transversely disposed shaft having a pair of pinions thereon in engagement with the racks of said calender racks, a driving connection between said second pinion and said transversely disposed shaft whereby rotation of the lap roll will move the calender racks upwardly in timed relation to the rotation of the lap roll.

7. In a machine for forming web material into rolls under pressure and having a pair of rollers for supporting and imparting rotation to the roll, a pin for receiving the web and means for engaging the pin at each end thereof for applying pressure thereto to cause it to be held in engagement with the rollers, a pinion secured on one end of the pin, a second pinion mounted on the pressure applying means and meshing with the first pinion, a vertically disposed shaft, a driving connection between said second pinion and said shaft, driving connections between the lower end of said shaft and the pressure applying means so that rotation of the pin, as the roll is formed, will move the pressure applying means upwardly in timed relation to the rotation of the pin.

8. In a machine for forming web material into rolls under pressure and having a pair of rollers for supporting and imparting rotation to the roll, a pin for receiving the web and means engaging the pin at each end thereof for applying pressure thereto to cause it to be held in engagement with the rollers, a pinion secured on one end of the pin, a second pinion mounted on the pressure applying means and meshing with the first pinion, a vertically disposed shaft, a beveled gear connection between said second pinion and said shaft, a transversely disposed shaft having a beveled gear connection with the lower end of said vertically disposed shaft, a second transversely disposed shaft having a geared connection with the first transversely disposed shaft on the one hand and also with the pressure applying means whereby rotation of the pin as the roll is being formed will move the pressure applying means upwardly in timed relation to the rotation of the pin and even pressure will be applied to the roll throughout its formation.

9. In a machine for winding rolls of material on a pin, means for engaging the exterior of the roll and imparting rotation thereto, movable means for engaging the pin at each end for applying pressure to the roll to hold it in contact with the means engaging the exterior thereof, and means driven by the pin for moving the pressure applying means away from the means for engaging the exterior of the roll, the rate of movement of the means for engaging the pin being directly proportional to the rate of increase in diameter of the material on the roll.

10. In a machine having a lap pin onto which a lap roll of fibrous material is formed, rotary means engaging the exterior of the lap roll for imparting rotation thereto, means for applying pressure to the lap roll during its formation, and a geared connection between the lap pin and the pressure applying means for moving the pressure applying means in timed relation to the rotation of the lap pin.

11. In a machine having an arbor onto which a roll of continuous material is wound, in combination, rotating means engaging the surface of the wound mass to impart winding rotation thereto, a pair of vertically slidable calender racks resisting the travel of the arbor away from the rotating means as the roll grows, and a positively acting escapement device letting off the racks to allow said arbor to travel away from said rotating means at a predetermined decreasing rate of speed which is directly proportional to the rate of increase in the radius of the desired roll.

12. In a machine for winding continuous material into roll form, in combination, feed rollers for said material, means for winding a roll through surface contact with the wound mass of the roll and providing for increase in the distance of the roll's axis from such point of surface contact as the roll grows, devices restraining such increase in this distance so as to compress the roll while being wound, and positive, non-yielding mechanical let-off means governed by the feed rollers to allow the axis of the roll to move away from said winding means at a predetermined decreasing rate which is inversely proportional to said distance.

13. In a picker having means for forming lap rolls on a lap pin, comprising a pair of calender rolls and calender racks for holding the lap roll in contact with the calender rolls, positive nonyielding means permitting gradual movement of the calender racks upwardly under the pressure exerted by the lap roll at a rate of speed which is an inverse proportion at all times to the diameter of the lap roll and means for varying the upward movement of said racks for different lap rolls.

14. In a picker having a pair of calender rolls on which a lap roll is formed, means driven by the picker for driving the calender rolls, a lap pin around which the lap roll is wound, a pair of calender racks for engaging the ends of the pin, the lap roll exerting an upward pressure on said calender racks, means driven by the calender racks during their upward movement, a clutch connection between the calender rolls and the means driven by the calender racks serving to retard the upward movement of the calender racks, and other means disposed between the calender racks and the calender rolls for permitting upward movement of the calender racks at a rate which is gradually decreasing during the formation of the roll and which is inversely proportional to the diameter of the lap roll.

15. In a machine for forming web rolls and having a pin onto which the web is wound, means driven by the machine and engaging the exterior of the roll for turning the roll, a pair of calender racks for engaging the pin, mechanism driven by the calender racks as they move upwardly under the pressure of the web roll being formed, other mechanism driven by the machine, an over-riding clutch between the two mechanisms, a chain having an operative connection with the two mechanisms, a pulley in one mechanism onto which the chain is wound upon itself to reduce gradually the amount of upward movement allowed the calender racks and thereby apply uniform pressure to the roll during its formation.

16. In a machine for forming lap rolls of fibrous material, having a lap pin for receiving the lap roll and having a pair of calender racks in engagement with the pin for retarding the upward movement of the pin to thereby apply pressure to the roll as it is formed, a pair of friction rollers driven by the machine and on which the roll rests during its formation, a rack on each calender rack, a transversely disposed shaft having pinions thereon engaging said racks, a train of gears driven by the machine, a second train of gears driven by said transversely disposed shaft having a chain windable thereon to decrease gradually the rate of upward movement of the calender racks as the friction rollers revolve, a clutch between the two trains of gears whereby the first train of gears controls the movement of the second train of gears.

17. In a machine for forming lap rolls having a lap pin for receiving the lap roll and a pair of calender racks for engaging the ends of the pin and adapted to be moved upwardly by the pressure exerted thereon by the lap on the pin as the same is wound thereon, a train of gears connected to and driven by the calender racks in their upward movement, a spool driven by said train of gears, a chain secured to said spool and being adapted to be wound onto the spool by the upward movement of the lap pin, a shaft having a sprocket thereon on which said chain is mounted and whereby said shaft will be rotated by the winding of the chain on said spool, a second train of gears driven by the machine, a clutch disposed between said shaft and said second train of gears constructed to prevent movement of the first train of gears at a rate faster than the second train of gears and serving to hold the first train of gears against movement except with the second train of gears.

18. In a machine for forming lap rolls and having a lap pin for receiving the lap roll and having a pair of calender racks for engaging the ends of the pin and adapted to be moved upwardly by the pressure exerted thereon by the lap on the pin as the same is wound thereon, a train of gears connected to and driven by the calender racks in their upward movement, a spool driven by said train of gears, a chain secured to said spool and being adapted to be wound onto the spool by the upward movement of the lap pin, a shaft carrying a sprocket thereon on which the chain is mounted and whereby said shaft will be rotated by the winding of the chain on said spool, a second train of gears driven by the machine, a clutch disposed between said shaft and said second train of gears to prevent movement of the first train of gears at a rate faster than the second train of gears and serving to hold the first train of gears against movement except with the second train of gears and means operable automatically upon the building of a roll to a predetermined size for disconnecting the shaft from the second train of gears to allow unrestrained upward movement of the calender racks.

19. In a machine for forming lap rolls of fibrous material, having a lap pin for receiving the lap roll and a pair of calender racks normally restraining upward movement of the lap pin, a pair of friction rollers driven by the machine on which the lap roll rests while it is being formed, a rack on each calender rack, a transversely disposed shaft carrying pinions which engage said racks, driving connections between the machine and said shaft, including a chain and spool connection whereby the chain will be wound onto the spool by the upward movement of the racks to thereby decrease gradually the rate of upward movement of the racks as the roll is being formed.

20. In a picker having revolving friction rollers driven by the picker on which a lap roll is formed on a pin, a pair of calender racks for engaging the pin for holding the roll against the friction rollers, the pressure of the roll on the racks exerting an upward pressure against them, means driven by the upward movement of the calender racks, including a train of gears, a second train of gears driven by the picker, connecting means between the two trains of gears including a sprocket wheel having a sprocket chain mounted thereon and a pulley onto which the chain is wound by the upward movement of the calender racks, the rate of upward movement of the calender racks being decreased gradually as the roll is formed.

21. Means for forming a web roll on a pin comprising a friction roller for engaging and turning the roll, means for driving the friction roller, means for engaging the pin and holding the roll in contact with the friction roller, a train of gears connected to and driven by the means for engaging the pin, a spool driven by said gears, a second train of gears driven by the means for driving the friction roller, a driving connection between the spool and the second gears comprising a sprocket wheel and a chain mounted on said wheel, the upward movement of the calender racks winding the chain onto said spool so that the diameter of the chain wound on the spool, at any time during the formation of the lap, will be directly proportional to the diameter of the roll and whereby the upward movement of the calender racks will become slower gradually as the diameter of the roll increases.

22. In a lap-roll winding machine, in combination, a roll-carrying arbor raised by the increasing diameter of the roll, a positive and non-yielding let-off resisting the ascent of such arbor, and an escapement driven independently of said arbor for releasing the let-off progressively in accordance with the increase in diameter of the lap being wound.

23. In a machine for winding fibrous material into roll form, feeding rolls, a lap-pin, rotating means engaging the exterior surface of the material when rolled around the lap-pin for imparting rotation to the roll thus formed, slidable calender racks resisting the lateral movement of the lap-pin away from the said rotating means, and positively driven escapement devices governed by the rate of travel of the fibrous material for releasing the calender racks to lateral movement of the lap pin at a predetermined rate of travel to conform to the radius of the roll desired to be wound.

24. In a lap-winding machine, in combination, a winding arbor upon which a roll is adapted to be wound, calender racks engaging therewith, means positively controlling the upward movement of the racks, and a positive non-yielding escapement for such means driven at a uniformly decreasing rate which is directly proportional to the rate of increase in diameter of said roll.

25. In a machine in which a roll is wound from a continuous sheet of material onto a lap pin, in combination a pair of friction rolls for engaging the surface of the wound roll to impart rotation thereto, a pair of calender racks for engaging said pin to restrict the upward travel thereof as a lap is being formed, a train of gears connected to said racks and a positive non-yielding escapement mechanism governed by the rate of travel of the sheet of material as it is wound onto the lap pin for decelerating the movement of said gears at a gradual predetermined rate to thereby retard the upward travel of said pin.

26. In a machine in which a roll is wound from a continuous sheet of material onto a lap pin, in combination a pair of friction rolls for engaging the surface of the wound roll to impart rotation thereto; a pair of calender racks for engaging said pin to restrict the upward travel thereof as a lap roll is being formed, a train of gears connected to said racks and a positively driven escapement mechanism governed by the rate of travel of the sheet of material as it is wound onto the lap pin for decelerating the movement of said gears at a gradual predetermined rate to thereby retard the upward travel of said pin.

27. In a machine for winding a web of material onto a lap pin to form lap rolls, in combination means for engaging the exterior of the lap roll and imparting rotation thereto, means for applying pressure to the lap roll to hold the same under pressure against the means engaging the exterior thereof, means driven in timed relation to the rate of travel of the web onto the lap roll, positively driven connections between the second and third means for moving the second means away from the first means in direct proportion to the number of layers wound on the web as the diameter of the lap roll increases.

28. In a lap roll winding machine having means for winding a lap of a predetermined thickness, in combination, a roll-carrying arbor raised by the increasing diameter of the roll, a positive and non-yielding let-off resisting the ascent of such arbor, an escapement positively releasing the let-off at a rate expressed by the following mathematical formula:

$$F = \frac{zs}{2\pi r}\sqrt{1 - \left[\frac{y}{2(c+r)}\right]^2}$$

F = rate of lap let-off
z = thickness of lap
s = lineal speed of lap as delivered
r = radius of lap roll at a given time
y = distance between centers of winding means
c = radius of winding means.

29. A machine for forming lap rolls of fibrous material on a suitable lap pin, having friction rolls for driving the lap roll by contact, a pair of calender racks engaging said pin for applying pressure to the lap roll as it is wound, positive nonyielding means driven by the machine in timed relation to the friction rolls for allowing upward movement of the calender racks a predetermined amount for each revolution of the lap roll, an escapement positively releasing the let-off at a rate expressed by the following mathematical formula:

$$F = \frac{zs}{2\pi r}\sqrt{1 - \left[\frac{y}{2(c+r)}\right]^2}$$

F = rate of lap let-off
z = thickness of lap
s = lineal speed of lap as delivered
r = radius of lap roll at a given time
y = distance between centers of friction rolls
c = radius of friction rolls and means for automatically releasing the calender racks from the means driven by the machine upon completion of the lap roll, and manually operable means for resetting the pressure applying means to begin the formation of a new roll.

30. Means for forming a lap roll of predetermined density comprising friction rollers, a lap pin onto which a web of material is wound in convolute form by said rollers, a calender rack engaging each end of said pin, and an escapement positively controlling the releasing of said calender racks at a rate expressed by the following mathematical formula:

$$F = \frac{zs}{2\pi r}\sqrt{1 - \left[\frac{y}{2(c+r)}\right]^2}$$

F = rate of web let-off
z = thickness of web
s = lineal speed of web as delivered
r = radius of web roll at a given time
y = distance between centers of friction rollers
c = radius of friction rollers.

31. In a finisher picker, a pair of friction rolls driven by the picker, a lap pin onto which a lap of material issuing from the picker is adapted to be wound, a lap roll being adapted to rest on the friction rolls and to be driven thereby, means for engaging the ends of the lap pin, geared means driven in timed relation to the rate of travel of the lap for controlling the return of movement of the means engaging the ends of the lap pin away from the friction rolls in a direction normal to a line passing through the friction rolls centers, and at a rate expressed by the following mathematical formula:

$$F = \frac{zs}{2\pi r}\sqrt{1 - \left[\frac{y}{2(c+r)}\right]^2}$$

F = rate of lap let-off
z = thickness of lap
s = lineal speed of lap as delivered
r = radius of lap roll at a given time
y = distance between centers of friction rolls
c = radius of friction rolls.

32. In a machine having an arbor onto which a roll of continuous lap material is wound, in combination, a pair of rotating means engaging the surface of the wound mass to impart winding rotation thereto, means resisting the travel of the arbor away from the rotating means comprising a non-yielding geared means governed by the rate of travel of the material and connected to the resisting means for releasing the resisting means in a direction normal to a line passing through the centers of the rotating means and at a predetermined variable rate expressed by the following mathematical formula:

$$F=\frac{zs}{2\pi r}\sqrt{1-\left[\frac{y}{2(c+r)}\right]^2}$$

F=rate of lap let-off
z=thickness of lap
s=lineal speed of lap as delivered
r=radius of lap roll at a given time
y=distance between centers of rotating means
c=radius of rotating means.

33. In a machine having rotating means for winding a roll from a continuous sheet of material through peripheral engagement with the roll, an escapement positively controlling the increase in perpendicular distance between a line passing through the centers of the rotating means and the center of said roll at a rate expressed by the following mathematical formula:

$$F=\frac{zs}{2\pi r}\sqrt{1-\left[\frac{y}{2(c+r)}\right]^2}$$

F=rate of increase in distance
z=thickness of sheet
s=lineal speed of sheet as delivered
r=radius of roll at a given time
y=distance between centers of rotating means
c=radius of rotating means.

34. In a machine having rotating means for winding a roll from a continuous sheet of material through peripheral engagement with the roll, a shaft adapted to be driven at a uniform rate of rotation, an escapement positively controlled by said shaft, said escapement positively controlling the increase in perpendicular distance between a line passing through the centers of the rotating means and the center of said roll at a rate expressed by the following mathematical formula:

$$F=\frac{zs}{2\pi r}\sqrt{1-\left[\frac{y}{2(c+r)}\right]^2}$$

F=rate of increase in distance
z=thickness of sheet
s=lineal speed of sheet as delivered
r=radius of roll at a given time
y=distance between centers of rotating means
c=radius of rotating means.

WILLIAM G. REYNOLDS.